United States Patent
He et al.

(10) Patent No.: US 10,128,907 B2
(45) Date of Patent: Nov. 13, 2018

(54) FINGERPRINT SENSOR MODULE-BASED DEVICE-TO-DEVICE COMMUNICATION

(71) Applicant: Shenzhen Huiding Technology Co., Ltd., Shenzhen (CN)

(72) Inventors: Yi He, San Diego, CA (US); Bo Pi, Carlsbad, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/592,580

(22) Filed: Jan. 8, 2015

(65) Prior Publication Data

US 2015/0195007 A1    Jul. 9, 2015

Related U.S. Application Data

(60) Provisional application No. 61/925,637, filed on Jan. 9, 2014.

(51) Int. Cl.
*H04B 5/00* (2006.01)
*G06K 9/00* (2006.01)
(Continued)

(52) U.S. Cl.
CPC .......... *H04B 5/0012* (2013.01); *G06F 3/044* (2013.01); *G06F 3/0416* (2013.01); *G06K 9/0002* (2013.01)

(58) Field of Classification Search
CPC ....... H04B 5/0012; H04B 5/02; G06K 7/0008
(Continued)

(56) References Cited

U.S. PATENT DOCUMENTS 5,682,032 A    10/1997   Philipp
5,732,148 A *  3/1998   Keagy ............... G06K 9/00046
                                                      356/71

(Continued)

FOREIGN PATENT DOCUMENTS

KR    2012-0140016 A    12/2012
WO    2015/077733 A1     5/2015
(Continued)

OTHER PUBLICATIONS

NPL ECMA NFC—Interface and Protocol (NFCIP-1), Jun. 2013.*
(Continued)

*Primary Examiner* — Dong-Chang Shiue
(74) *Attorney, Agent, or Firm* — Perkins Coie LLP (57) ABSTRACT

Devices, systems, and techniques are provided for enabling device-to-device communications between a first device equipped with a fingerprint detection module that includes a metal contact and a second device equipped with a capacitive coupling port. In one aspect, a technique for enabling the device-to-device communications includes: positioning the first device and the second device so that the metal contact of the fingerprint detection module of the first device is in capacitive coupling with the capacitive coupling port of the second device; and establishing device-to-device communication between the first device and the second device through electrical signaling between the metal contact of the first device and the capacitive coupling port of the second device. During the device-to-device communication, the metal contact operates as a transmitting and receiving electrode for sending and receiving electrical signals to and from the capacitive coupling port.

15 Claims, 8 Drawing Sheets (51) Int. Cl.
*G06F 3/044* (2006.01)
*G06F 3/041* (2006.01)

(58) Field of Classification Search
USPC ....... 455/41.1, 129, 289, 319, 410; 382/124, 382/321
See application file for complete search history.

(56) References Cited

U.S. PATENT DOCUMENTS

| | | | |
|---|---|---|---|
| 5,914,701 A | 6/1999 | Gersheneld et al. | |
| 6,011,859 A * | 1/2000 | Kalnitsky | G06K 9/00053 382/100 |
| 6,501,846 B1 * | 12/2002 | Dickinson | G06F 3/021 345/156 |
| RE45,601 E * | 7/2015 | Dean | |
| 2001/0025532 A1 | 10/2001 | Kramer | |
| 2003/0055785 A1 | 3/2003 | Lahiri | |
| 2003/0184430 A1 | 10/2003 | Kumar | |
| 2005/0008197 A1 | 1/2005 | Dennis | |
| 2005/0221798 A1 | 10/2005 | Sengupta et al. | |
| 2005/0263596 A1 * | 12/2005 | Nelson | G06K 19/077 235/441 |
| 2007/0232929 A1 | 10/2007 | Kilgore et al. | |
| 2007/0299322 A1 | 12/2007 | Miyajima et al. | |
| 2008/0122803 A1 | 5/2008 | Izadi et al. | |
| 2009/0083850 A1 | 3/2009 | Fadell et al. | |
| 2009/0088197 A1 * | 4/2009 | Stewart | G06F 9/4446 455/550.1 |
| 2009/0252384 A1 * | 10/2009 | Dean | G06K 9/0002 382/124 |
| 2009/0252386 A1 * | 10/2009 | Dean | G06K 9/00013 382/124 |
| 2010/0009658 A1 | 1/2010 | Wu | |
| 2010/0148068 A1 | 6/2010 | Schwaneberg et al. | |
| 2010/0220900 A1 * | 9/2010 | Orsley | G06F 3/0421 382/124 |
| 2011/0102346 A1 | 5/2011 | Orsley et al. | |
| 2011/0102567 A1 | 5/2011 | Erhart | |
| 2011/0227856 A1 | 9/2011 | Corroy et al. | |
| 2011/0317886 A1 | 12/2011 | Matsuoka | |
| 2012/0050988 A1 | 3/2012 | Rothkopf et al. | |
| 2012/0090757 A1 | 4/2012 | Buchan et al. | |
| 2012/0242635 A1 | 9/2012 | Erhart et al. | |
| 2012/0258773 A1 | 10/2012 | Alvarez Rivera et al. | |
| 2013/0097079 A1 | 4/2013 | Bruder | |
| 2013/0108124 A1 | 5/2013 | Wickboldt et al. | |
| 2013/0129162 A1 | 5/2013 | Cheng et al. | |
| 2013/0177220 A1 * | 7/2013 | Erhart | G06K 9/0002 382/124 |
| 2013/0181949 A1 * | 7/2013 | Setlak | G06K 9/0002 345/175 |
| 2013/0194071 A1 * | 8/2013 | Slogedal | G06K 19/07701 340/5.82 |
| 2013/0211291 A1 | 8/2013 | Tran | |
| 2013/0231046 A1 * | 9/2013 | Pope | G06K 9/00013 455/41.1 |
| 2013/0257804 A1 | 10/2013 | Vu et al. | |
| 2013/0258086 A1 * | 10/2013 | Erhart | H04N 5/23219 348/77 |
| 2013/0259329 A1 | 10/2013 | Wickboldt et al. | |
| 2013/0265137 A1 | 10/2013 | Nelson et al. | |
| 2013/0307818 A1 * | 11/2013 | Pope | G06F 3/044 345/174 |
| 2014/0002237 A1 * | 1/2014 | Infante | B60R 25/252 340/5.32 |
| 2014/0093145 A1 * | 4/2014 | Feekes | G06K 9/00006 382/124 |
| 2014/0103943 A1 * | 4/2014 | Dunlap | G01N 27/221 324/663 |
| 2014/0139978 A1 | 5/2014 | Kwong | |
| 2014/0268516 A1 * | 9/2014 | Fathollahi | A45C 11/00 361/679.01 |
| 2014/0270413 A1 | 9/2014 | Slaby et al. | |
| 2014/0333328 A1 * | 11/2014 | Nelson | G06F 3/044 324/663 |
| 2015/0071509 A1 | 3/2015 | Myers | |
| 2015/0146944 A1 | 5/2015 | Pi et al. | |
| 2015/0149310 A1 * | 5/2015 | He | G06Q 20/322 705/21 |
| 2015/0169932 A1 * | 6/2015 | Riedijk | G06K 9/00013 348/77 |
| 2015/0185954 A1 * | 7/2015 | Chang | G06F 3/0416 345/173 |
| 2015/0242675 A1 * | 8/2015 | Pope | G06F 3/044 382/124 |
| 2015/0363629 A1 | 12/2015 | Lee et al. | |
| 2016/0004899 A1 * | 1/2016 | Pi | G06F 3/0412 345/173 |
| 2016/0344767 A1 | 11/2016 | Baldwin et al. | |

FOREIGN PATENT DOCUMENTS

| | | |
|---|---|---|
| WO | 2015/081326 A1 | 6/2015 |
| WO | 2016/007444 A1 | 1/2016 |

OTHER PUBLICATIONS

International Search Report and Written Opinion dated Oct. 5, 2015 for International Application No. PCT/US2015/039273, filed on Jul. 6, 2015 (11 pages).

International Search Report and Written Opinion dated Mar. 10, 2015 for International Application No. PCT/US2014/067195, filed on Nov. 24, 2014 (8 pages).

International Search Report and Written Opinion dated Apr. 16, 2015 for International Application No. PCT/US2014/067828, filed on Nov. 28, 2014 (11 pages).

* cited by examiner

FINGERPRINT SENSOR MODULE-BASED
DEVICE-TO-DEVICE COMMUNICATION

CROSS REFERENCE TO RELATED
APPLICATIONS

This patent document claims the benefit of U.S. Provisional Patent Application No. 61/925,637, filed on Jan. 9, 2014. The entire content of the before-mentioned patent application is incorporated by reference as part of the disclosure of this document.

TECHNICAL FIELD

The present disclosure generally relates to device-to-device communication.

BACKGROUND

Electronic computing and/or communication devices tend to include one or more types of wired and wireless technologies for communication with another device. Examples of types of wired and wireless communication technologies include Universal Serial Bus (USB), WiFi, Bluetooth and Near Field Communication (NFC). Using any of these device-to-device communication technologies, electronic computing and/or communication devices can exchange various signals including data, instructions, content, etc.

SUMMARY

Examples of implementations of the disclosed technology can include devices, systems, and techniques for performing device-to-device communication between a fingerprint detection module of one device and a capacitive touch screen of another device. In some implementations, the device-to-device communication according to the disclosed technology includes communication between a fingerprint detection module of one device and a fingerprint detection module of another device. The fingerprint detection module used for the device-to-device communication of the disclosed technology can include various types of fingerprint detection modules including a self-capacitive detection module, a mutual-capacitive detection module, active detection module, passive detection module, optical detection module, or a combination of various types of fingerprint detection modules.

In addition, the fingerprint detection module used for the disclosed device-to-device communication can perform human fingerprint detection and authentication including verifying that the detected fingerprint is from a live human contact rather than a copy of the fingerprint. Moreover, the various fingerprint detection modules used in the disclosed device-to-device communication can perform biometric sensing, such as heartbeat monitoring.

In one aspect, a method for device-to-device communication includes detecting, at a first device, a capacitive coupling established between a conductive contact included in a fingerprint detection module of the first device and a capacitive coupling module of a second device. The method includes transmitting, from the first device to the second device, an electrical signal through the established capacitive coupling between the conductive contact of the first device and the capacitive coupling module of the second device to conduct device-to-device communication between the first and second devices.

The method can be implemented in various ways to include one or more of the following features. For example, the method can include initiating, at the first device, a device-to-device communication initiation signal through the established capacitive coupling between the conductive contact of the fingerprint detection module in the first device and the capacitive coupling module of the second device. The method can include receiving, at the first device, acknowledgement of the initiated device-to-device communication initiation signal from the second device. The method can include transmitting, from the first device, an acknowledgement back signal to the second device, and turning the first device into a connect state ready for the device-to-device communication. The capacitive coupling module can include a capacitive touch screen. The capacitive coupling module can include a fingerprint detection module that includes a conductive contact. The conductive contact can include a metal ring.

In another aspect, a device for conducting device-to-device communication with another device through capacitive coupling includes a fingerprint detection module. The fingerprint detection module includes a conductive contact to detect an electrical signal indicative of a capacitive coupling established with a capacitive coupling module of the other device. The fingerprint detection module includes an array of capacitive fingerprint sensor pixels to detect a fingerprint data signal. The fingerprint detection module includes a fingerprint sensor processor in communication with the conductive contact to receive the electrical signal, and in communication with the array of capacitive fingerprint sensor pixels to receive the fingerprint data signal. The fingerprint sensor processor transmits at least one additional electrical signal through the conductive contact to establish with the other device the device-to-device communication using the established capacitive coupling.

The device can be implemented in various ways to include one or more of the following features. For example, the conductive contact can operate as a transmitting and receiving electrode for sending and receiving electrical signals to and from the capacitive coupling module of the other device. The conductive contact can include a metal ring. The capacitive coupling module can include a capacitive touch screen. The capacitive coupling module can include a metal contact of a fingerprint detection module in the other device. The device can include a mobile device.

In another aspect, a method for device-to-device communication includes establishing, from a device, a device-to-device communication link with another device through capacitive coupling between the devices; and exchanging with the other device signals through the established device-to-device communication link.

The method can be implemented in various ways to include one or more of the following features. For example, establishing the device-to-device communication can include establishing the capacitive coupling between a capacitive coupling module in one of the two devices and a conductive contact of a fingerprint detection module in the remaining one of the two devices. Exchanging the signals can include transmitting a message and receiving an acknowledgement. Exchanging the signals can include exchanging data. Establishing the device-to-device communication can include transmitting a device-to-device communication initiation signal through the established capacitive coupling. The method can include turning the device into a connect state ready for the device-to-device communication. The capacitive coupling module can include a capacitive touch screen, and the conductive contact can include a metal ring.

In yet another aspect, a method for providing communications between a first device equipped with a fingerprint detection module that includes a metal contact and a second device equipped with a capacitive coupling port is described. The method includes: positioning the first device and the second device so that the metal contact of the fingerprint detection module of the first device is in capacitive coupling with the capacitive coupling port of the second device; and establishing device-to-device communication between the first device and the second device through electrical signaling between the metal contact of the first device and the capacitive coupling port of the second device. During the device-to-device communication, the metal contact operates as a transmitting and receiving electrode for sending and receiving electrical signals to and from the capacitive coupling port.

The method can be implemented in various ways to include one or more of the following features. For example, the metal contact can include a metal ring. The capacitive coupling port can include a capacitive touch screen. The capacitive coupling port can include a capacitive touch pad, such as a touch pad on a notebook computer. The capacitive coupling port can include a metal contact of another fingerprint detection module.

Various examples of fingerprint detection modules, fingerprint sensor modules, and capacitive touch screens described in this patent document can be integrated with mobile devices (e.g., smartphones, tablets, laptops), computing devices (e.g., personal computers), and other electronic devices to perform device-to-device communications in addition to fingerprint authentication processes on these devices.

DETAILED DESCRIPTION

Electronic computing devices, such as laptops, tablets, smartphones, and gaming systems routinely include a fingerprint detection module to perform user authentication based on detecting the user's fingerprint pattern. In addition to the fingerprint detection module, the same electronic computing devices routinely include a touch screen to receive user input directly through screen. The disclosed technology provides for repurposing the preexisting fingerprint detection module and the touch screen to conduct device-to-device communication.

Figure 1:
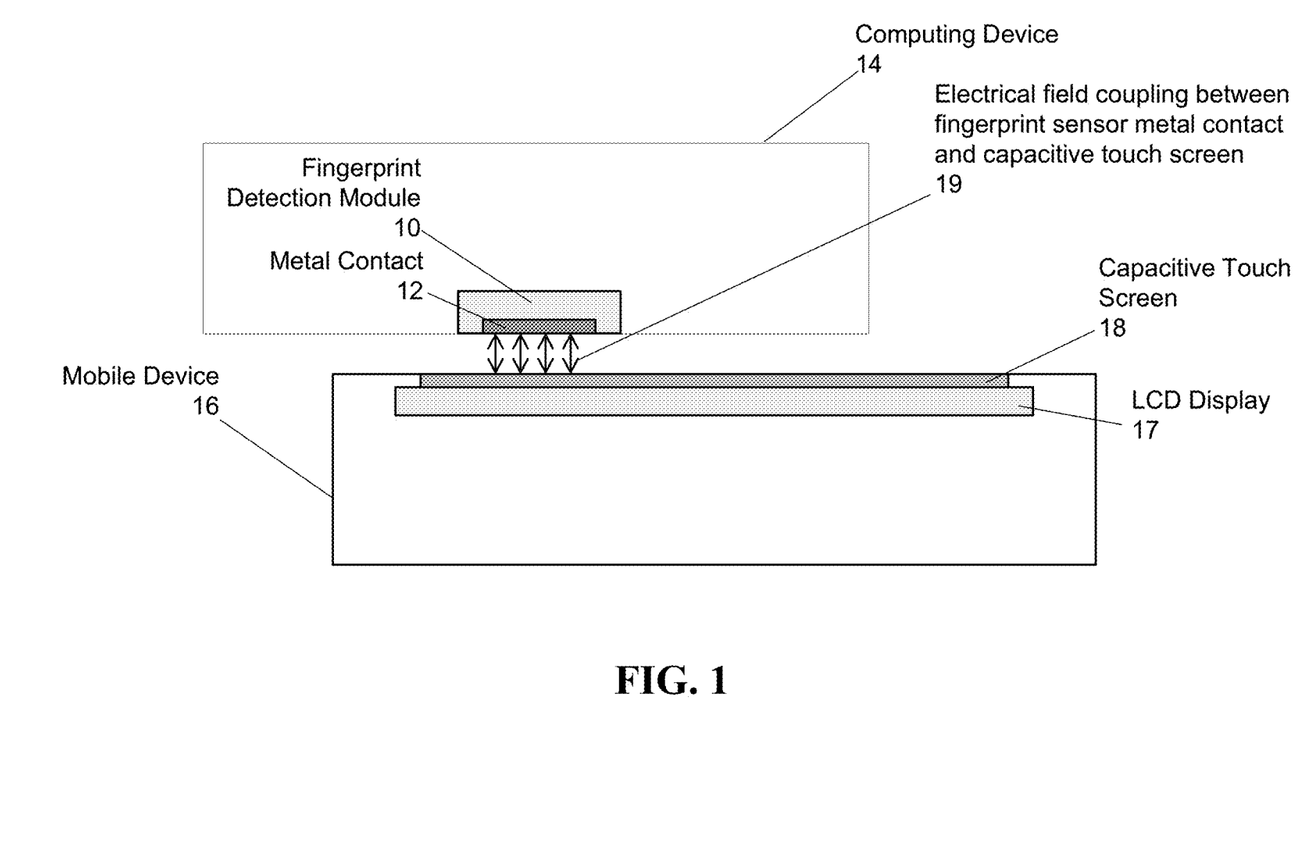
FIG. 1 is a block diagram illustrating an exemplary device-to-device communication where a fingerprint detection module of one device is in communication with a capacitive touch screen of another device.

FIG. 1 is a block diagram illustrating an exemplary device-to-device communication where a fingerprint detection module of one device is in communication with a capacitive touch screen of another device. In the example illustrated in FIG. 1, an electronic device, such as a computing device 14 is in device-to-device communication with another electronic device, such as a mobile device 16. Non-exhaustive examples of the electronic devices 14 and 16 include a mobile phone, a smart phone, a laptop, a tablet computer, and a wearable device.

The electronic device 14 includes a fingerprint detection module 10. The fingerprint detection module 10 can include a conductive contact 12 and can be integrated as a part of the computing device 14. The conductive contact 12 of the fingerprint detection module 10 can include a metal or other conductive materials. In addition, the conductive contact 12 can be implemented in a number of different shapes and/or structures including a metal ring structure.

The fingerprint detection module 10 can be implemented based on a number of different sensing technologies including self-capacitive sensing, mutual capacitive sensing, active sensing, passive sensing, optical sensing, or a combination of the available sensing technologies. The fingerprint detection module 10 can be used to implement device-to-device communication according to the disclosed technology regardless of the sensing technology used.

The mobile device 16 in the example shown in FIG. 1 is equipped with a capacitive touch screen 18 disposed over a display panel 17. Non-exhaustive examples of the display panel 17 includes a liquid crystal display (LCD) panel, a light emitting diode (LED) panel, an organic LED (OLED), an active-matrix OLED (AMOLED), and a super AMOLED.

Device-to-device communication between the computing device 14 and the mobile device 16 is enabled when the two devices are in close proximity to each other to have the fingerprint detection module 10 of the computing device 14 substantially face the capacitive touch screen 18 of the mobile device 16 such that a small air gap is formed between the conductive contact 12 of the fingerprint detection module 10 and the capacitive touch screen 18 of the mobile device 16. Through capacitive coupling, an electric field 19 can be created between the metal contact 12 on the fingerprint detection module 10 and the capacitive touch screen 18 of mobile device 16. The distance between the fingerprint detection module 10 and the capacitive touch screen 18 corresponding to the small air gap is enough to generate the electric field due to capacitive coupling. Communication signals can be transmitted between the devices through the electric field created by the capacitive coupling of the conductive contact 12 of the fingerprint detection module 10 with the capacitive touch screen 18 of the mobile device 16.

Figure 2:
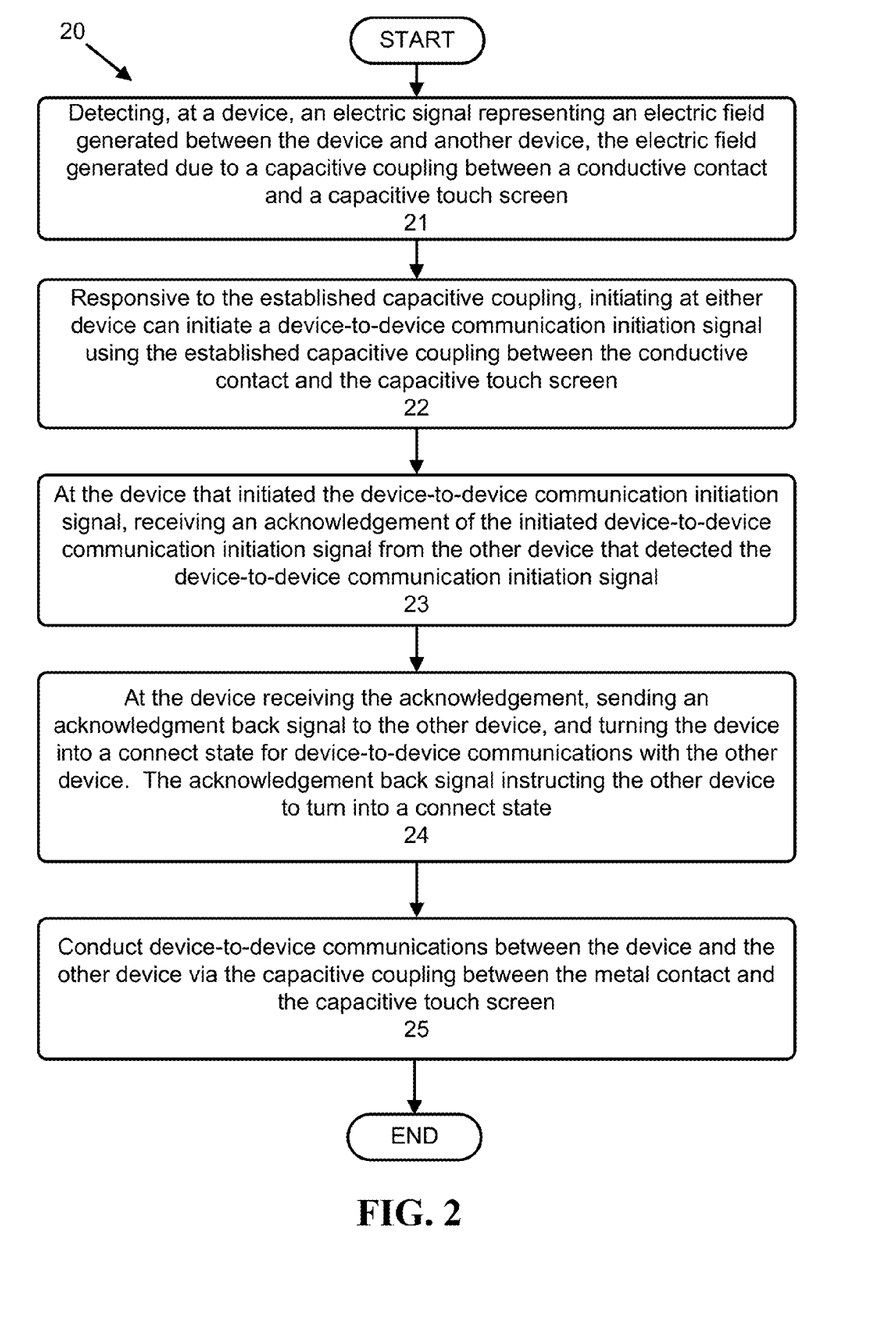
FIG. 2 is a process flow diagram illustrating an exemplary process for initiating and conducting device-to-device communication through capacitive coupling.

FIG. 2 is a process flow diagram showing an exemplary process 20 for conducting device-to-device communications between a capacitive touch screen (e.g., capacitive touch screen 18 of the mobile device 16) and a fingerprint detection module (e.g., metal contact 12 of the fingerprint detection module 10). The process 20 includes detecting, at a device, an electric signal representing an electric field generated between the device and another device, the electric field generated due to a capacitive coupling between a conductive contact and a capacitive touch screen (21). Once the capacitive coupling is established, either device can initiate a device-to-device communication initiation signal using the established capacitive coupling between the conductive contact and the capacitive touch screen (22). At the device that initiated the device-to-device communication initiation signal, receiving an acknowledgement of the initiated device-to-device communication initiation signal from the other device that detected the device-to-device communication initiation signal (23). The acknowledgement is received through the established capacitive coupling between the conductive contact and the touch screen. At the device receiving the acknowledgement, sending an acknowledgment back signal to the other device, and turning the device into a connect state for device-to-device communications with the other device (24). Likewise, the other device can detect the acknowledgment back signal from the device, and responsive to receiving the acknowledgment back signal from the device, can set the other device into a connect state for device-to-device communications with the device that initiated the device-to-device communication initiation signal. Once both devices are in the connect state, device-to-device communications between the device and the other device can be conducted via the capacitive coupling between the metal contact and the capacitive touch screen (25). Using the established device-to-device communication link through capacitive coupling, the device and the other device can exchange a variety of information including data, such as fingerprint detection related information; instructions and messages related to the device-to-device communications; content for presenting on the display; any other information that can be shared between devices. In the process 20, the conductive contact and the capacitive touch screen can be included in the device and the other device respectively or in the other device and the device respectively.

Either device can initiate the device-to-device communications using capacitive coupling of the capacitive touch screen 18 of the mobile device 16 and the conductive contact 12 of the fingerprint detection module 10. The ability to initiate the device-to-device communication is not dependent on whether the device includes a fingerprint detection module or a capacitive touch screen. The device-dot-device communications using capacitive coupling according to the disclosed technology can be initiated from the conductive contact of the fingerprint detection module or from the capacitive touch screen.

In some implementations, the device-to-device communications through capacitive coupling can be initiated and conducted between two devices that include a fingerprint detection module. The capacitive coupling between devices that include a fingerprint detection module is accomplished between the conductive (e.g., metal) contacts of the fingerprint detection modules in the corresponding devices.

Figure 3:
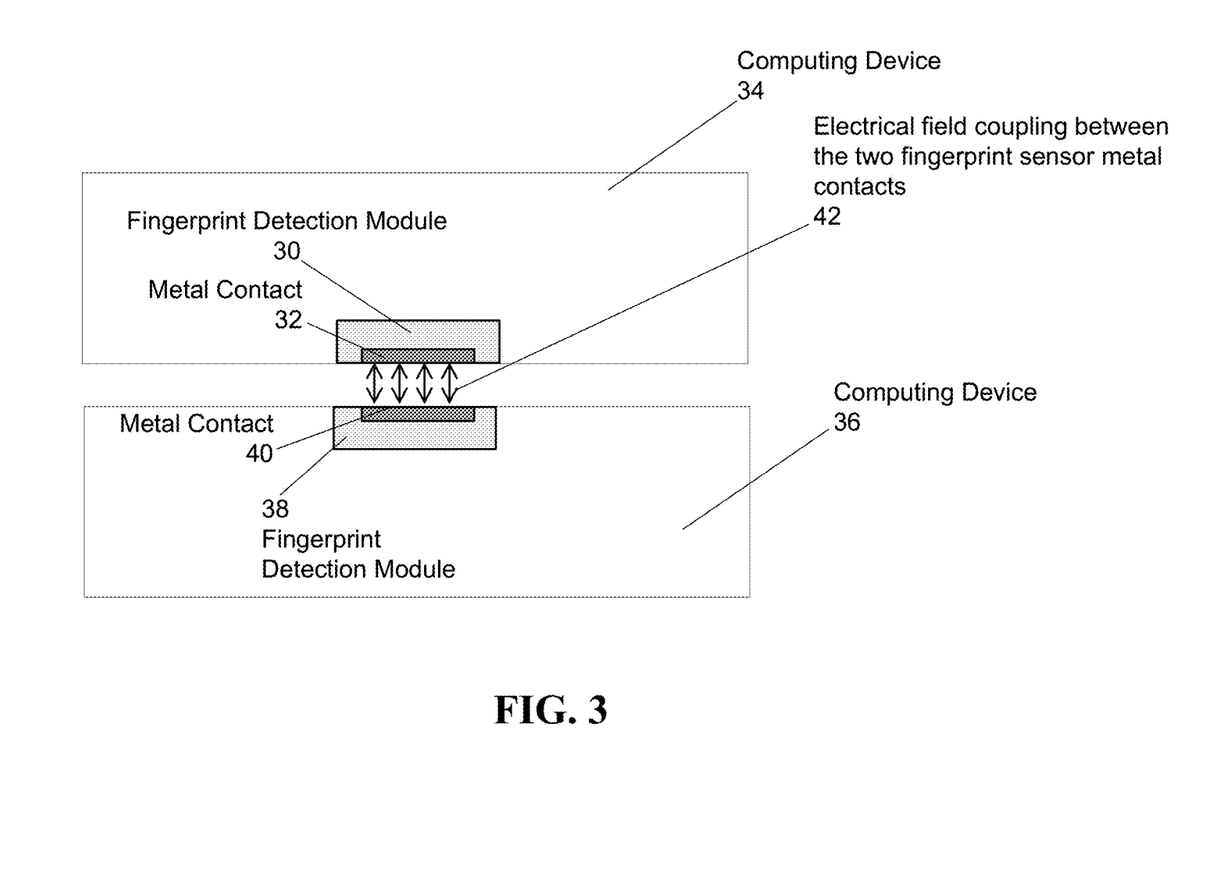
FIG. 3 is a block diagram illustrating another exemplary device-to-device communication wherein a fingerprint detection module of one device is in communication with a fingerprint detection module of another device.

FIG. 3 is a block diagram illustrating another exemplary device-to-device communication wherein a fingerprint detection module of one device is in communication with a fingerprint detection module of another device. In the example shown in FIG. 3, two devices 34 and 36 are involved in device-to-device communications through capacitive coupling. Both devices 34 and 36 include respective fingerprint modules 30 and 38. The fingerprint module 30 of the device 34 includes a conductive contact 32. Similarly, the fingerprint module 38 of device 36 includes a conductive contact 40. Both conductive contacts 32 and 40 can be implemented using a metal. In addition, the conductive contacts 32 and 40 of the respective fingerprint detection modules 30 and 38 can be implemented in various structures including a metal ring structure. Similar to the devices 14 and 16 of FIG. 1, non-exhaustive examples of devices 34 and 36 can include a mobile phone, a smart phone, a laptop, a tablet computer, a wearable device, among others.

Similar to the fingerprint detection module 10 of FIG. 1, the fingerprint detection modules 30 and 38 can be implemented based on a number of different sensing technologies including self-capacitive sensing, mutual capacitive sensing, active sensing, passive sensing, optical sensing, or a combination of the available sensing technologies. The fingerprint detection module 10 can be used to implement device-to-device communication according to the disclosed technology regardless of the sensing technology used.

Either of the devices 34 and 36 can initiate device-to-device communications when the two devices 34 and 36 are in close proximity to each other and oriented to substantially face each other such that with a small gap is formed between the conductive contact 32 of the fingerprint detection module 30 and the conductive contact 40 of the fingerprint detection module 38 to enable capacitive coupling between the two conductive contacts. Through capacitive coupling, an electric field 19 can be created between the conductive contacts 32 and 40. The distance between the conductive contacts 32 and 40 of respective fingerprint detection modules 30 and 38 corresponding to the small air gap is enough to generate the electric field due to capacitive coupling. Communication signals can be transmitted between the devices through the electric field created by the capacitive coupling of the conductive contacts 32 and 40.

Once the capacitive coupling has been established, each of the conductive contacts 32 and 40 can be used as a transmitting and receiving electrode for sending and receiving electrical signals to and from the opposing conductive contact. Through capacitive coupling, device-to-device communication is enabled through the transmission of electrical signals through the created electrical field between the conductive contacts 32 and 40 of the respective fingerprint detection modules 30 and 38 of devices 34 and 36.

Figure 4:
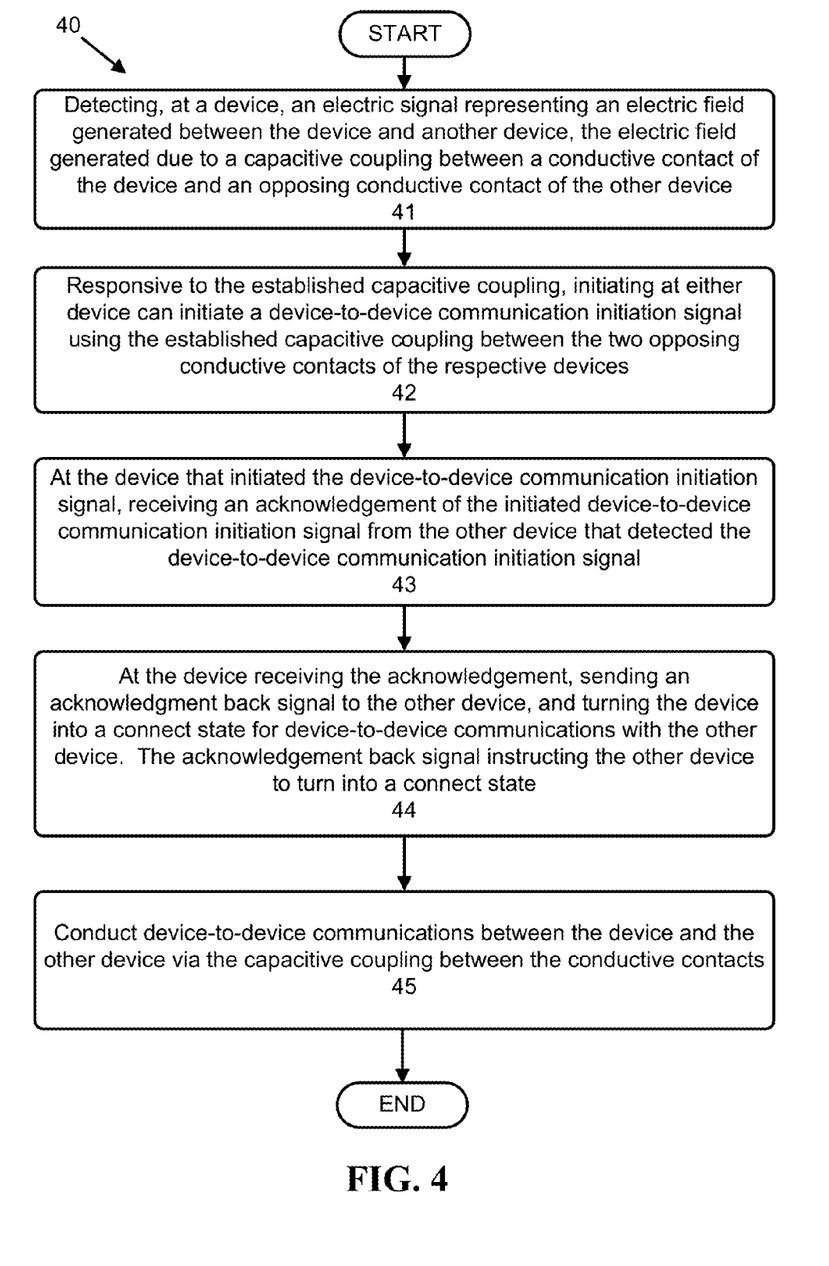
FIG. 4. is a process flow diagram illustrating another exemplary process for initiating and conducting device-to-device communication through capacitive coupling.

FIG. 4 is a process flow diagram showing an exemplary process 40 for conducting device-to-device communications between two fingerprint detection modules (e.g., conductive contacts 32 and 40 of the fingerprint detection modules 30 and 38). The process 40 is substantially similar to the device-to-device communication process 20 of FIG. 2 and includes detecting, at a device, an electric signal representing an electric field generated between the device and another device, the electric field generated due to a capacitive coupling between a conductive contact of the device and an opposing conductive contact of the other device (41). Once the capacitive coupling is established, either device can initiate a device-to-device communication initiation signal using the established capacitive coupling between the two opposing conductive contacts of the respective devices (42). At the device that initiated the device-to-device communication initiation signal, receiving an acknowledgement of the initiated device-to-device communication initiation signal from the other device that detected the device-to-device communication initiation signal (43). The acknowledgement is received through the established capacitive coupling between the two conductive contacts. At the device receiving the acknowledgement, sending an acknowledgment back signal to the other device, and turning the device into a connect state for device-to-device communications with the other device (44). Likewise, the other device can detect the acknowledgment back signal from the device, and responsive to receiving the acknowledgment back signal from the device, can set the other device into a connect state for device-to-device communications with the device that initiated the device-to-device communication initiation signal. Once both devices are in the connect state, device-to-device communications between the device and the other device can be conducted via the capacitive coupling between the conductive contacts (45). Using the established device-to-device communication link through capacitive coupling, the device and the other device can exchange a variety of information including data, such as fingerprint detection related information; instructions and messages related to the device-to-device communications; content for presenting on the display; any other information that can be shared between devices. In addition, either device can initiate the device-to-device communications using capacitive coupling of the conductive contacts 32 and 40 of the respective fingerprint detection modules 30 and 38.

The fingerprint detection modules (e.g., fingerprint detection modules 10, 30 and 38) as described in FIGS. 1, 2, 3 and 4 can be implemented in various ways. FIGS. 5 through 7C provide non-exhaustive examples of implementations the fingerprint detection modules 10, 30 and 38.

Figure 5:
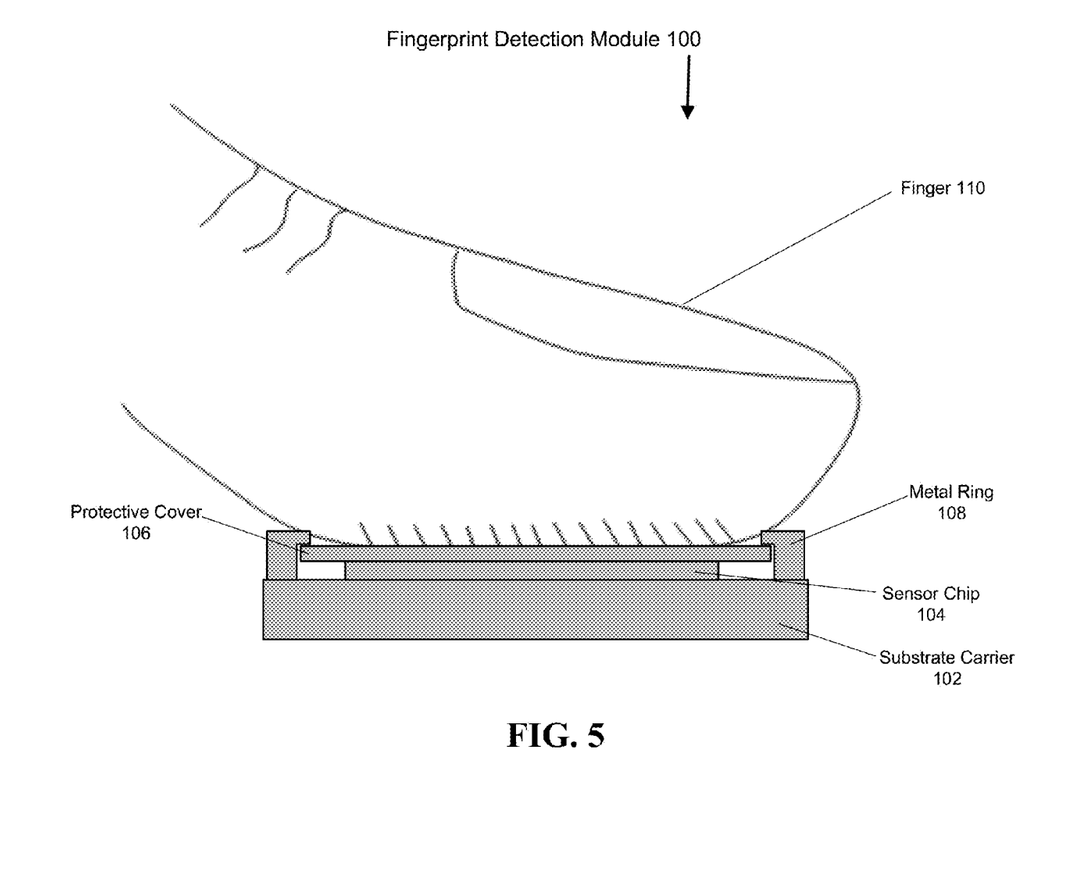
FIG. 5 is a schematic showing a cross-sectional view of an exemplary fingerprint detection module.

FIG. 5 is a schematic showing a cross-sectional view of an exemplary fingerprint detection module 100 (finger is not included) that can be used to implement fingerprint detection modules 10, 30 and 38 of FIGS. 1, 2, 3 and 4. As shown in FIG. 3, fingerprint detection module 100 includes a substrate carrier 102 and a fingerprint sensor detector chip 104 affixed on top of substrate carrier 102. Fingerprint sensor detector chip 104 can use capacitive sensing to collect fingerprint data and detect fingerprints. However, fingerprint sensor detector chip 104 can also be configured to collect fingerprint data and detect fingerprints by non-capacitive means. Fingerprint detection module 100 also includes a protective cover 106 which is placed over fingerprint sensor detector chip 104 to protect fingerprint sensor detector chip 104 and can also serve as a dielectric spacer. Protective cover 106 may be made out of high dielectric-constant material, such as ceramic, sapphire, zirconia, among others. Protective cover 106 may also have a hard coating, such as diamond like carbon. Note that in the embodiment of FIG. 3, the edges of protective cover 106 extends beyond the edges of fingerprint sensor detector chip 104 in all directions.

Fingerprint detection module 100 additional includes a metal ring 108 placed on substrate carrier 102 and around protective cover 106, which protects the edge of protective cover 106 and can also serve as a signal electrode. Note also that a finger 110 (not part of fingerprint detection module 100) can make contact with metal ring 108 when finger 110 is pressed on fingerprint detection module 100 for fingerprint detection.

Figure 6:
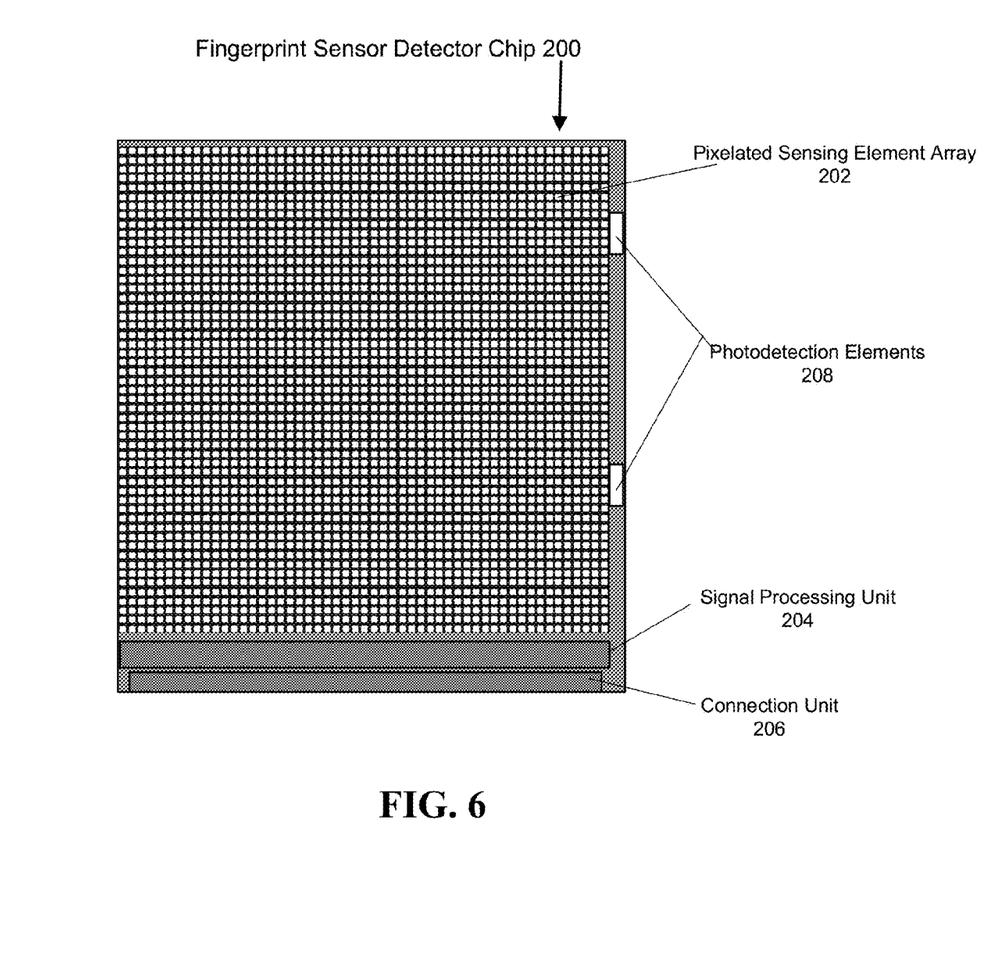
FIG. 6 is a schematic showing an exemplary fingerprint sensor detector chip included in a fingerprint detection module.

FIG. 6 shows a schematic of an exemplary fingerprint sensor detector chip 200 that can be used to implement fingerprint detection modules 10, 30 and 38 of FIGS. 1, 2, 3 and 4. Note that fingerprint sensor detector chip 200 (or "sensor chip 200") may be used as sensor chip 104 in fingerprint detection module 100 or in combination with other types of fingerprint detection modules described below.

As shown in FIG. 6, fingerprint sensor detector chip 200 includes a pixelated sensing element array 202 which occupies a significant portion of the sensor chip. Each sensing element in pixelated sensing element array 202 may be a CMOS capacitive sensor or other types of sensors capable of sensing fingerprint features. Fingerprint sensor detector can also include a signal processing unit 204 for processing signals received from pixelated sensing element array 202, and a connection unit 206 coupled to signal processing unit 204. Connection unit 206 may include multiple electrodes which can be connected to external circuitry through wire-bonding, bump bonding or other connection means. Connection unit 206 may be situated along an edge of sensor chip 200 for the convenience of interfacing with other components of a fingerprint detection module.

Note that sensor chip 200 also includes one or more photodetection elements 208, which may be located at one or more sections of sensor chip 200. Photodetection elements 208 can include, but are not limited to CMOS photodetectors, charge-coupled devices (CCD) photodetectors, light-emitting diode (LED) photodetectors, photoresistors, photovoltaic photodetectors, and photodiodes. In the embodiment shown, there are two photodetection elements located along one edge section of the sensor chip. In some embodiments, there can be just a single photodetection element or more than two photodetection elements. The multiple photodetection elements may be located at different edge sections of the silicon chip instead of all on the same side of the chip. Note that while FIG. 6 shows that photodetection elements 208 are integrated with pixelated sensing element array 202 on the same chip, other embodiments can have the photodetection elements off the sensor chip on a different area of the fingerprint sensor module.

Figure 7A:
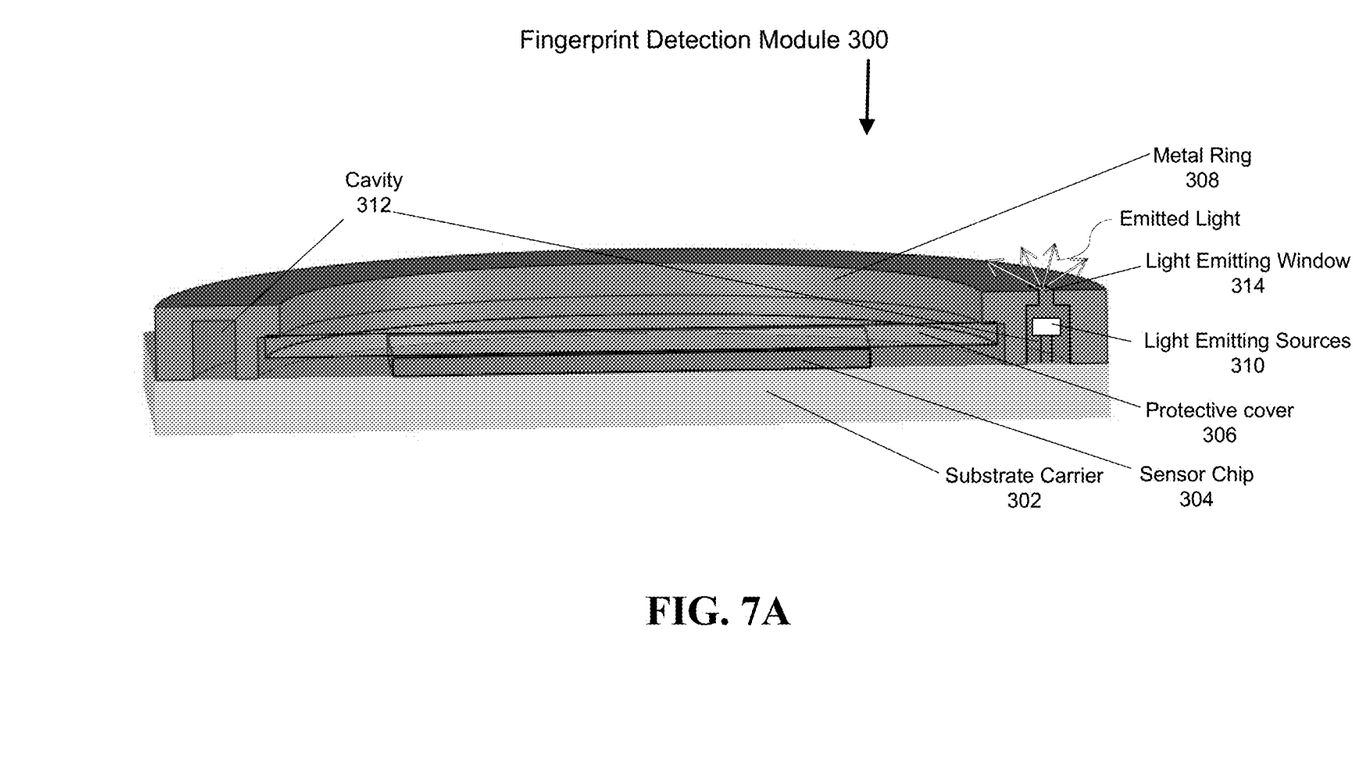
FIG. 7A represent perspective and cross-sectional views of an exemplary fingerprint detection module which includes an optical sensing mechanism for determining whether a detected object is human.

FIG. 7A shows a perspective and cross-sectional view of an exemplary fingerprint detection module 300 which includes an optical sensing mechanism for determining whether a detected object is human. Fingerprint detection module 300 can be used to implement fingerprint detection modules 10, 30 and 38 of FIGS. 1, 2, 3 and 4. Similarly to fingerprint detection module 100, fingerprint detection module 300 includes a substrate carrier 302, a fingerprint sensor detector chip 304, a protective cover 306, and a metal ring 308. Fingerprint sensor detector chip 304 can be fingerprint sensor detector chip 200 to include one or more photodetection elements. In some embodiments however, the one or more photodetection elements are located off of sensor chip 200 and on another area of substrate carrier 302 under protective cover 306. The protective cover can be made of transparent materials, such as sapphire or zirconia. If there are cosmetic coloring applied to protective cover 306, a transparent window may be used on protective cover 306 to allow light to go through. Note that in this embodiment, protective cover 306 covers the entire surfaces of sensor chip 304.

Fingerprint detection module 300 also includes one or more light emitting sources 310 which can be placed within a cavity 312 of metal ring 308. Light emitting sources 310 can include one or more light emitting diode (LED) chips, one or more diode lasers, or one or more other miniature light emitting devices. An exemplary LED chip in such applications can have an area of ~200 µm×200 µm and a thickness of ~200 µm. In the embodiment shown, cavity 312 has a ring structure which is formed around the underside of metal ring 308. However, cavity 312 in metal ring 308 can have many other configurations, for example, to only present around the locations of light emitting sources 310.

Light emitting sources 310 can be configured to emit detection light of desirable wavelengths in response to a human finger or an object making contact with fingerprint detection module 300. For example, metal ring 308 can serve as a sensing electrode to detect the contact from a human finger or an object. Light emitting sources 310 can emit light through one or more light emitting windows which cut through metal ring 308 to connect to cavity 312. In FIG. 7A, a light emitting window 314 is located directly above one of the light emitting sources 310 inside cavity 312. In some embodiments, light emitting sources 310 include a modulated light source.

Figure 7B:
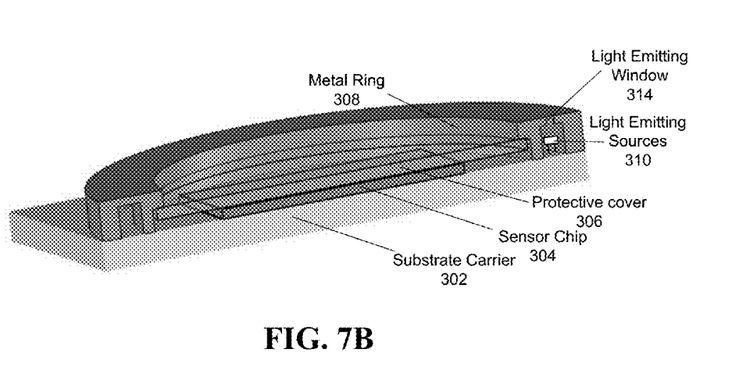
FIG. 7B represent another perspective and cross-sectional views of the fingerprint detection module in FIG. 7A.
Figure 7C:
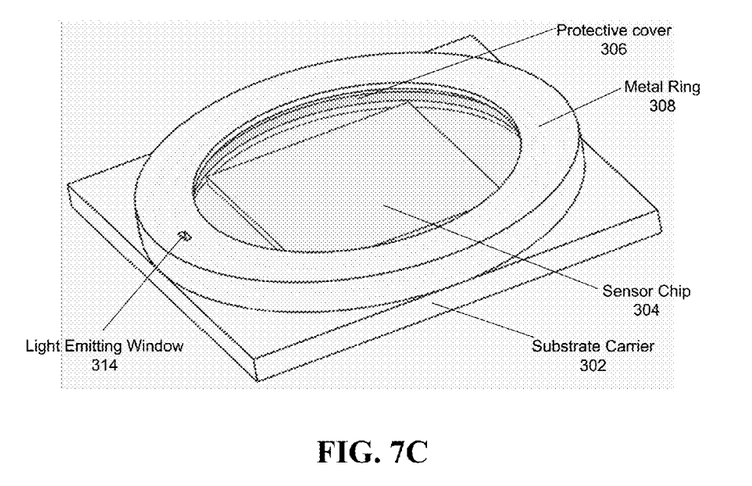
FIG. 7C represents a perspective view of the entire fingerprint detection module in FIG. 7A.

FIG. 7B provides another perspective and cross-sectional view of fingerprint detection module 300 in accordance with some embodiments described herein. FIG. 7C provides a perspective view of entire fingerprint detection module 300 in accordance with some embodiments described herein.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for device-to-device communication, comprising:

detecting, at a first device, a capacitive coupling established between a conductive contact included in a fingerprint detection module of the first device and a capacitive coupling module of a second device, wherein the fingerprint detection module includes a fingerprint sensor chip for detecting a fingerprint and a contact detector that includes a light source and an optical detector to determine whether a finger is placed over or in contact with the fingerprint detection module by using the optical detector to sense reflected light by the finger that is illuminated by light emitted by the light source, wherein a portion of a protective layer lies under the conductive contact and over the optical detector, wherein a cavity in the conductive contact lies under a top surface of the conductive contact and adjacent to the protective layer, and wherein the light source is positioned within the cavity and emits light through an opening in the top surface of the conductive contact without passing through the protective layer; and transmitting, from the first device to the second device, an electrical signal through the established capacitive coupling between the conductive contact of the first device and the capacitive coupling module of the second device to conduct device-to-device communication between the first and second devices, wherein the device-to-device communication between the first and second devices comprises:

sending, via the established capacitive coupling, an initiation signal from the first device to the second device and receiving, via the established capacitive coupling, from the second device an acknowledgement signal to confirm a proper capacitive coupling between the first and second devices;

placing, in response to the confirmation of the proper capacitive coupling between the first and second devices, the first device into a connect state and the second device into the connect state to enable the first and second devices to communicate to each other via the established capacitive coupling; and operating, while both first and second devices are in the connect state, the first and second devices via the established capacitive coupling to exchange data.

2. The method of claim 1, wherein the capacitive coupling module comprises a capacitive touch screen.

3. The method of claim 1, wherein the capacitive coupling module comprises a fingerprint detection module that includes another conductive contact.

4. The method of claim 1, wherein the conductive contact comprises a metal ring.

5. The method of claim 1, wherein
    the data exchanged between the first and second devices includes fingerprint detection information when first and second devices are in the connect state.

6. The method of claim 1, wherein
    the data exchanged between the first and second devices includes instructions and messages related to the device-to-device communications when the first and second devices are in the connect state.

7. The method of claim 1, wherein
    the data exchanged between the first and second devices includes contents to be presented on a display of the first device or the second device when the first and second devices are in respective connect state.

8. The method of claim 1, wherein the optical detector determines when an object in close proximity to the fingerprint detection module is a human.

9. An apparatus for conducting device-to-device communication between the apparatus and a device through capacitive coupling, the apparatus comprising:

a fingerprint detection module comprising:

a conductive contact configured to detect an electrical signal indicative of a capacitive coupling established with a capacitive coupling module of the device;

a fingerprint sensor chip for detecting a fingerprint;

a contact detector that includes a light source and an optical detector to determine whether a finger is placed over or in contact with the fingerprint detection module by using the optical detector to sense reflected light by the finger that is illuminated by light emitted by the light source, wherein a portion of a protective layer lies under the conductive contact and over the optical detector, wherein a cavity in the conductive contact lies under a top surface of the conductive contact and adjacent to the protective layer, and wherein the light source is positioned within the cavity and emits light through an opening in the top surface of the conductive contact without passing through the protective layer; and a fingerprint sensor processor in communication with the conductive contact to receive the electrical signal, and in communication with the light source and the optical detector to receive the fingerprint, wherein the fingerprint sensor processor is configured to transmit at least one additional electrical signal through the conductive contact to establish with the device the device-to-device communication using the established capacitive coupling, and wherein the apparatus performs a device-to-device communication process that includes:
  operating the device to send, via the established capacitive coupling, an initiation signal from the apparatus to the device and receive, via the established capacitive coupling, from the device an acknowledgement signal to confirm capacitive coupling between the apparatus and the device;
  placing, in response to the confirmation of the capacitive coupling between the apparatus and the device, the apparatus into a connect state to enable communications with the device via the established capacitive coupling; and
  operating, while the apparatus and the device are in the connect state, the apparatus via the established capacitive coupling to exchange data with the device.

10. The apparatus of claim 9, wherein the conductive contact operates as a transmitting and receiving electrode for sending and receiving electrical signals to and from the capacitive coupling module of the device.

11. The apparatus of claim 9, wherein the conductive contact includes a metal ring.

12. The apparatus of claim 9, wherein the capacitive coupling module includes a capacitive touch screen.

13. The apparatus of claim 9, wherein the capacitive coupling module includes a metal contact of a fingerprint detection module in the device.

14. The apparatus of claim 9, wherein the apparatus includes a mobile device.

15. The apparatus of claim 9, wherein the optical detector determines when an object in close proximity to the fingerprint detection module is human.

* * * * *